(12) United States Patent
Wong et al.

(10) Patent No.: US 7,044,767 B2
(45) Date of Patent: May 16, 2006

(54) HYBRID CARD INTERCONNECT

(75) Inventors: Hong W. Wong, Portland, OR (US);
Wah Yiu Kwong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 10/880,775

(22) Filed: Jun. 29, 2004

(65) Prior Publication Data

US 2005/0287861 A1   Dec. 29, 2005

(51) Int. Cl.
*H01R 13/64* (2006.01)

(52) U.S. Cl. ...................... 439/377; 439/681; 439/188

(58) Field of Classification Search .............. 439/377, 439/681, 188, 630, 677, 680
See application file for complete search history.

(56) References Cited

U.S. PATENT DOCUMENTS 5,608,606 A * 3/1997 Blaney ........................ 361/686
6,352,445 B1 * 3/2002 Takei et al. ................. 439/489
6,641,413 B1 * 11/2003 Kuroda ........................ 439/159
6,726,508 B1 * 4/2004 Watanabe et al. ........... 439/677
6,821,136 B1 * 11/2004 Lai .............................. 439/159
6,918,792 B1 * 7/2005 Hu et al. ..................... 439/630
6,932,652 B1 * 8/2005 Chen .......................... 439/630
2002/0020745 A1 * 2/2002 Yap et al. .................... 235/451

* cited by examiner

*Primary Examiner*—James R. Harvey
(74) *Attorney, Agent, or Firm*—Buckley, Maschoff & Talwalkar LLC (57) ABSTRACT

According to some embodiments, a hybrid card interconnect is provided. The hybrid card interconnect might include, for example, an enclosure having a rectangular opening at one side and defining a first rectangular cavity within the enclosure to receive a first type of card. The interconnection might further include movable guide members coupled to left and right inner surfaces of the enclosures and defining a second rectangular cavity, within the first cavity, to receive a second type card.

13 Claims, 12 Drawing Sheets

HYBRID CARD INTERCONNECT

BACKGROUND

A person might use a card, such as a Smart Card, for a number of different reasons. For example, a Smart Card might include a user's name, date of birth, image, and/or other information that may be used to authentic the person (e.g., information associated with his or her fingerprint or iris pattern). The person might then insert the card into a slot of a computer in order to authenticate his or her identity (e.g., to complete a secure transaction or to gain access to a secure network).

As another example, a person might use an ExpressCard to provide additional functionality to a computer. For example, a person might insert an ExpressCard into a slot of a computer in order to add memory to the computer system and/or to transfer information between the computer system and another device (e.g., a digital camera).

Note that different types of cards may have different standardized form factors. For example, a first type of card, such as an ExpressCard, might have a multi-pin connector on one end to exchange information. A second type of card, such as a Smart Card, on the other hand, might be thinner than the first type and have contacts on its top and/or bottom surface.

A computer may have multiple interconnects, each having a slot to receive a particular type of card. For example, the side of a mobile computer might have a first interconnect and a second interconnect placed side-by-side. In this case, however, the amount of space occupied on a Printed Circuit Board (PCB) within the mobile computer (e.g., a motherboard), also referred to as the "footprint" of the arrangement, may be significant. As another approach, the first interconnect could be placed above the second interconnect. In this case, however, the minimum height of the mobile computer might be increased.

DETAILED DESCRIPTION

Some embodiments of the present invention are associated with a "computer." As used herein, the term "computer" may refer to, for example, a Personal Computer (PC), a mobile computer, a laptop computer, a handheld computer, a notebook computer, a tablet computer, a sub-notebook computer, a mini-sub-notebook computer, a workstation, and/or a server. The term computer may also refer to other types of devices that process information, including a wireless telephone, a game system, an Automated Teller Machine (ATM) device, and/or a security device (e.g. at an airport).

Figure 1:
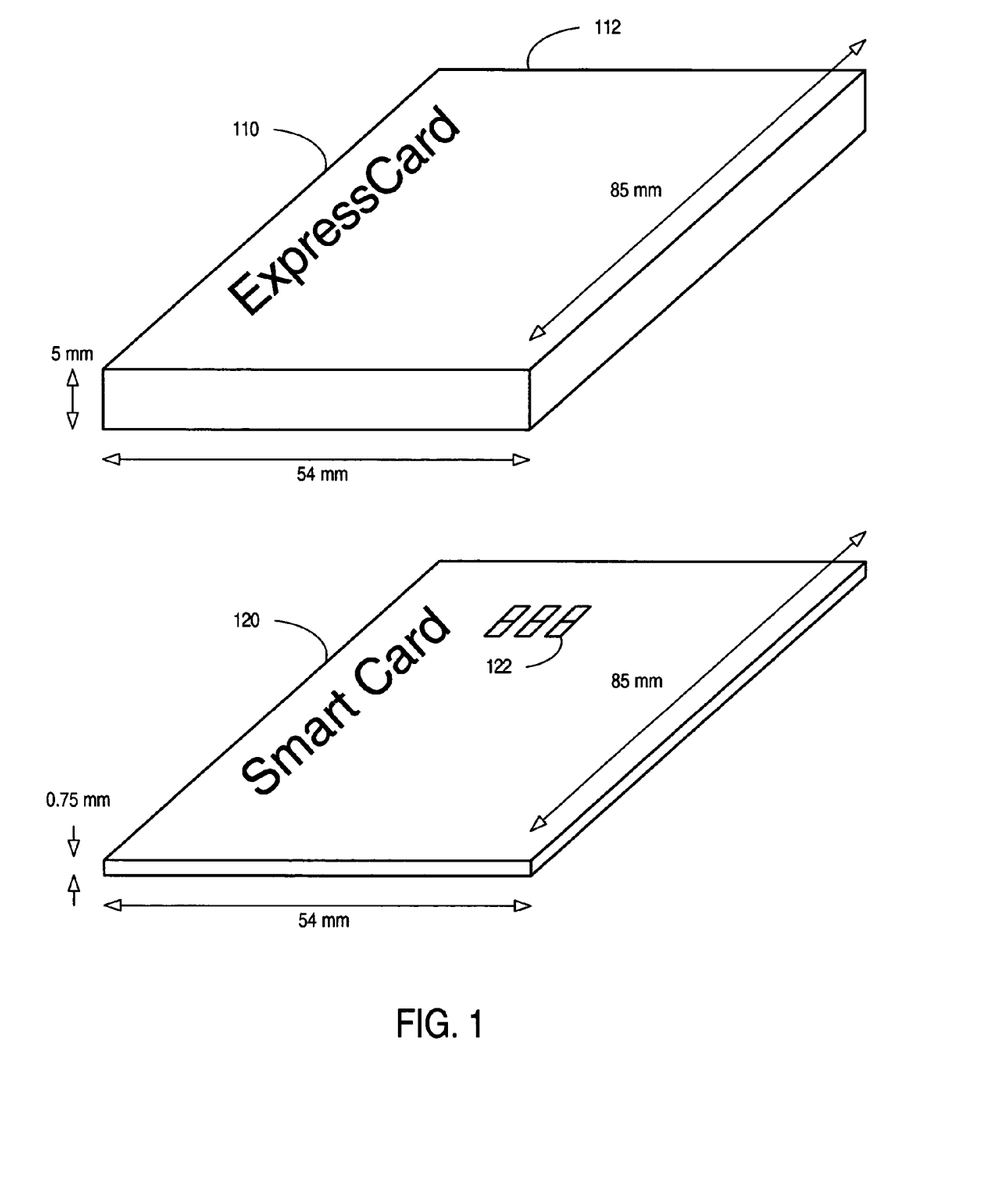
FIG. 1 illustrates two examples of a cards.

Some embodiments of the present invention are associated with an interconnect for a "card." As used herein, the term "card" may refer to, for example, a card that is used to store and/or process information. FIG. 1 illustrates two examples of cards. In particular, an ExpressCard 110 may be provided as set forth in the Personal Computer Memory Card International Association (PCMCIA) ExpressCard Standard Release 1.0 (2003). The ExpressCard 110 may, for example, be inserted into a computer interconnect slot to provide hardware capabilities such as extra memory, wired and wireless communication, and security devices. A pin interface at the front end 112 of the ExpressCard 110 may provide signal paths so that information can be exchanged between the ExpressCard 110 and a computer. The ExpressCard 110 is substantially (e.g., within ten percent of) 85 millimeters (mm) long, 54 mm wide, and 5 mm thick.

A Smart Card 120 may be provided as set forth in the International Standards Organization (ISO) standard number 7816 (1994). The Smart Card 120 may, for example, be associated with and/or provide authentication of a user. For example, a user may insert his or her Smart Card 120 into a computer interconnect slot and transactions that occur via the computer may be automatically authenticated. An interface 122 on the top or bottom of the Smart Card 120 may provide signal paths so that information can be exchanged between the Smart Card 120 and a computer. The Smart Card 120 is substantially 85 mm long, 54 mm wide, and 0.75 mm thick.

Figure 2:
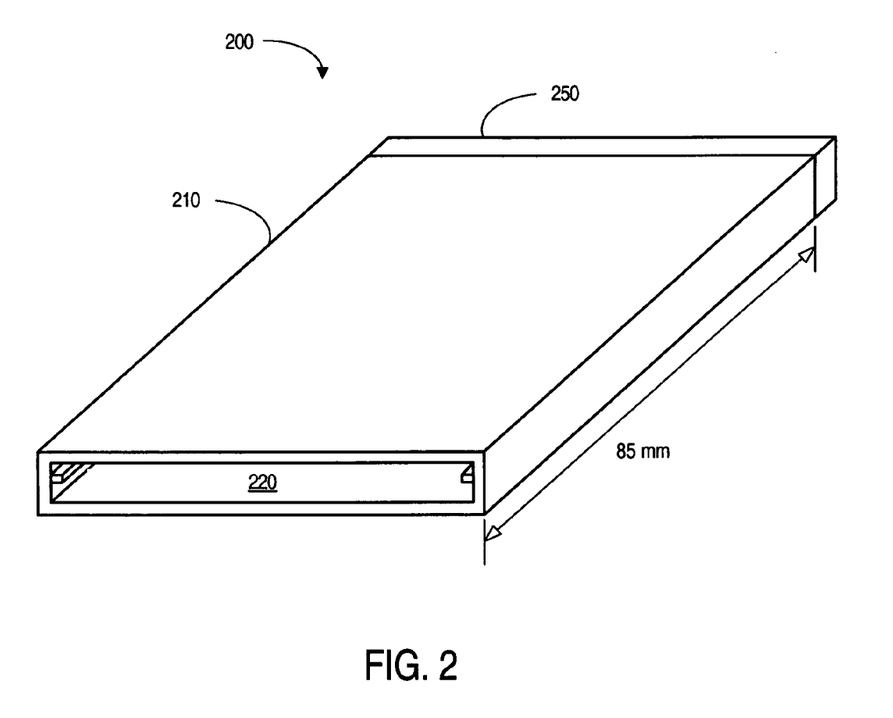
FIG. 2 is a perspective view of a hybrid card interconnect according to some embodiments.

FIG. 2 is a perspective view of a hybrid card interconnect 200 according to some embodiments. The interconnect 200 includes an enclosure 210 with a rectangular opening 220 at one side (e.g., the front as illustrated in FIG. 2). The enclosure 210 and the opening 220 define a first rectangular cavity within the enclosure 210 to receive a first type of card. Note that the first rectangular cavity may be substantially 85 mm deep. That is, the distance between a plane defined by the opening 220 and the inner surface of the opposite side of the enclosure may be substantially 85 mm.

Figure 3:
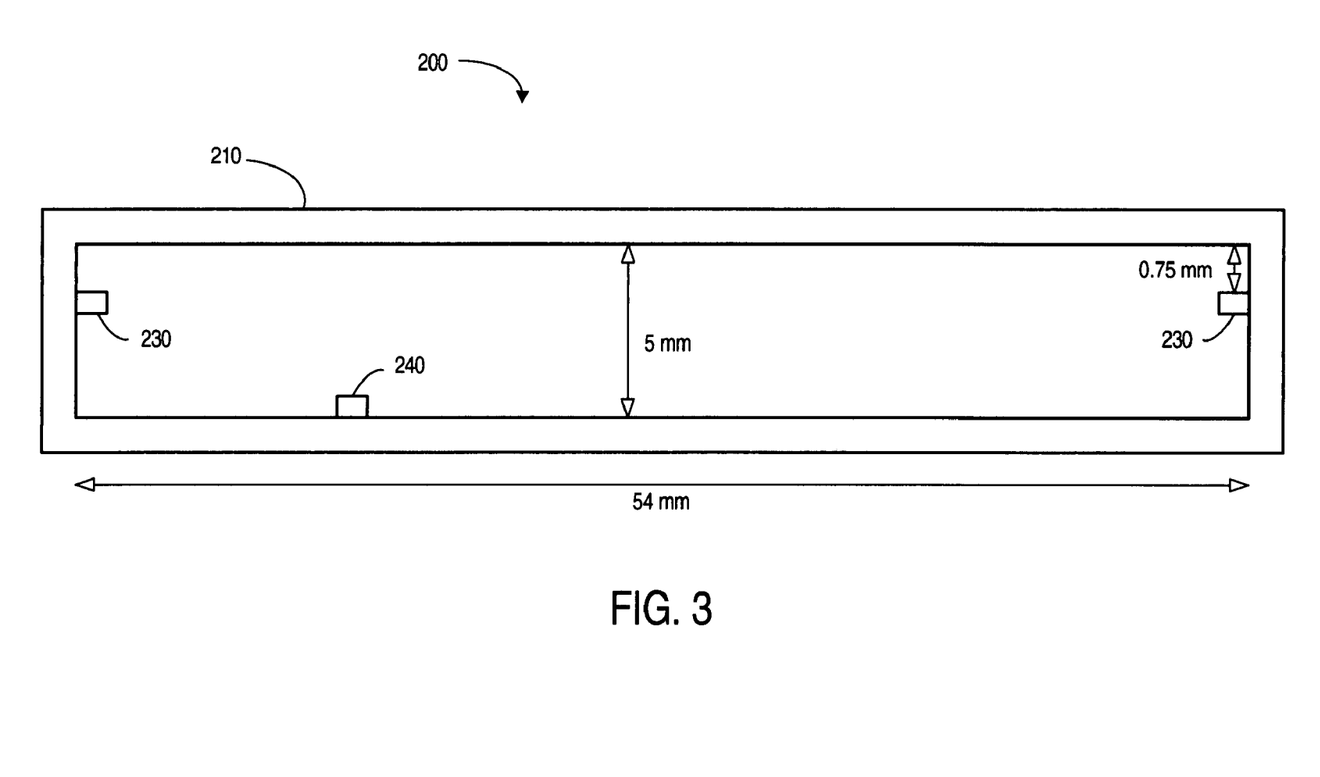
FIG. 3 is a front view of the hybrid card interconnect according to some embodiments.

FIG. 3 is a front view of the hybrid card interconnect 200. According to some embodiments, the first cavity defined by the enclosure 210 is to receive an ExpressCard 110. In this case, the distance between the inner sides of the enclosure in a first direction (horizontally in FIG. 2) may be substantially 54 mm and the distance between the inner sides of the enclosure in a second direction (vertically in FIG. 2) may be substantially 5 mm.

The interconnect 200 has movable guide members 230 coupled to the inner surfaces of opposite sides of the enclosure 210. The guide members 230 and the enclosure 210 define a second cavity, within the first cavity, to receive a second type of card. According to some embodiments, the second cavity is to receive a Smart Card 120. In this case, the distance between a surface of each guide member 230 and the inner surface of the nearest parallel side of the enclosure 210 may be substantially 0.75 mm. That is, the second cavity is defined above the guide member in FIG. 3.

Figure 4:
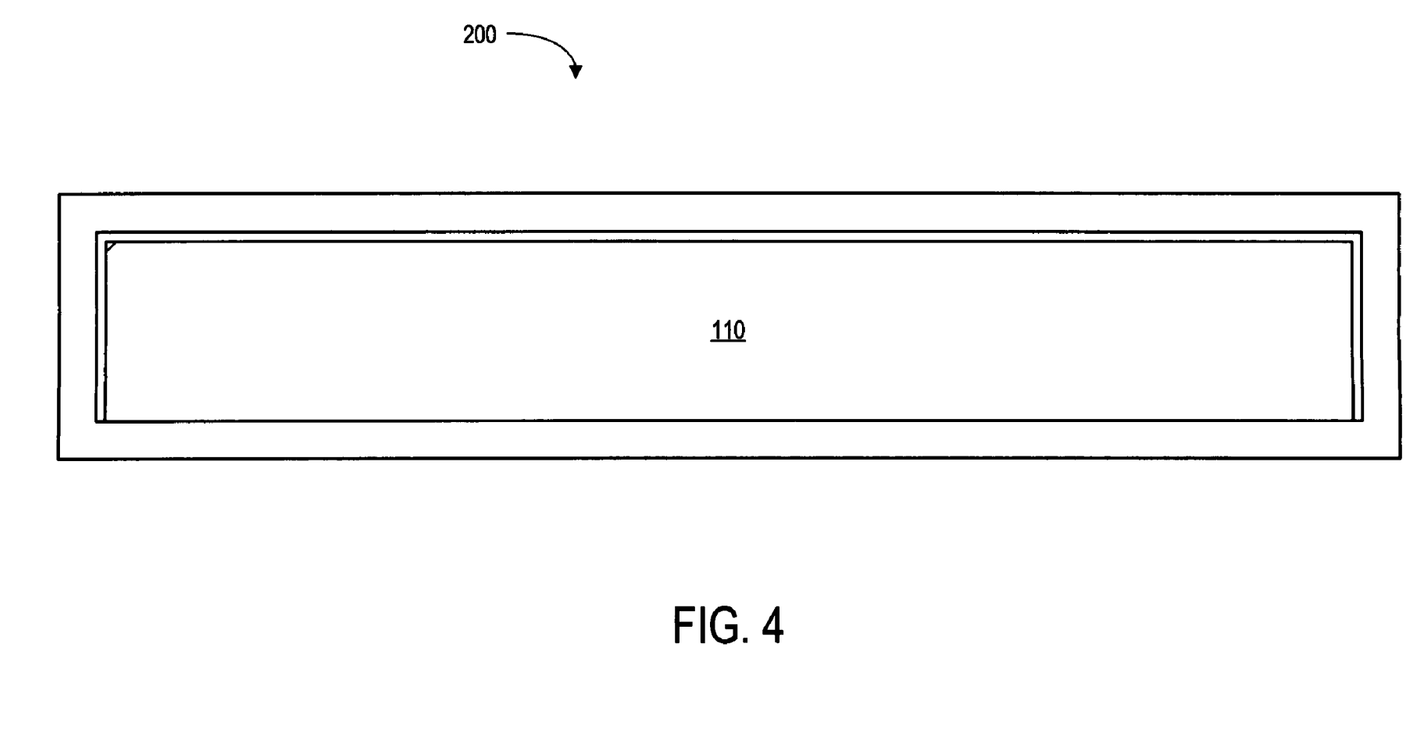
FIG. 4 illustrates the hybrid card interconnect when an ExpressCard has been inserted according to some embodiments.
Figure 5:
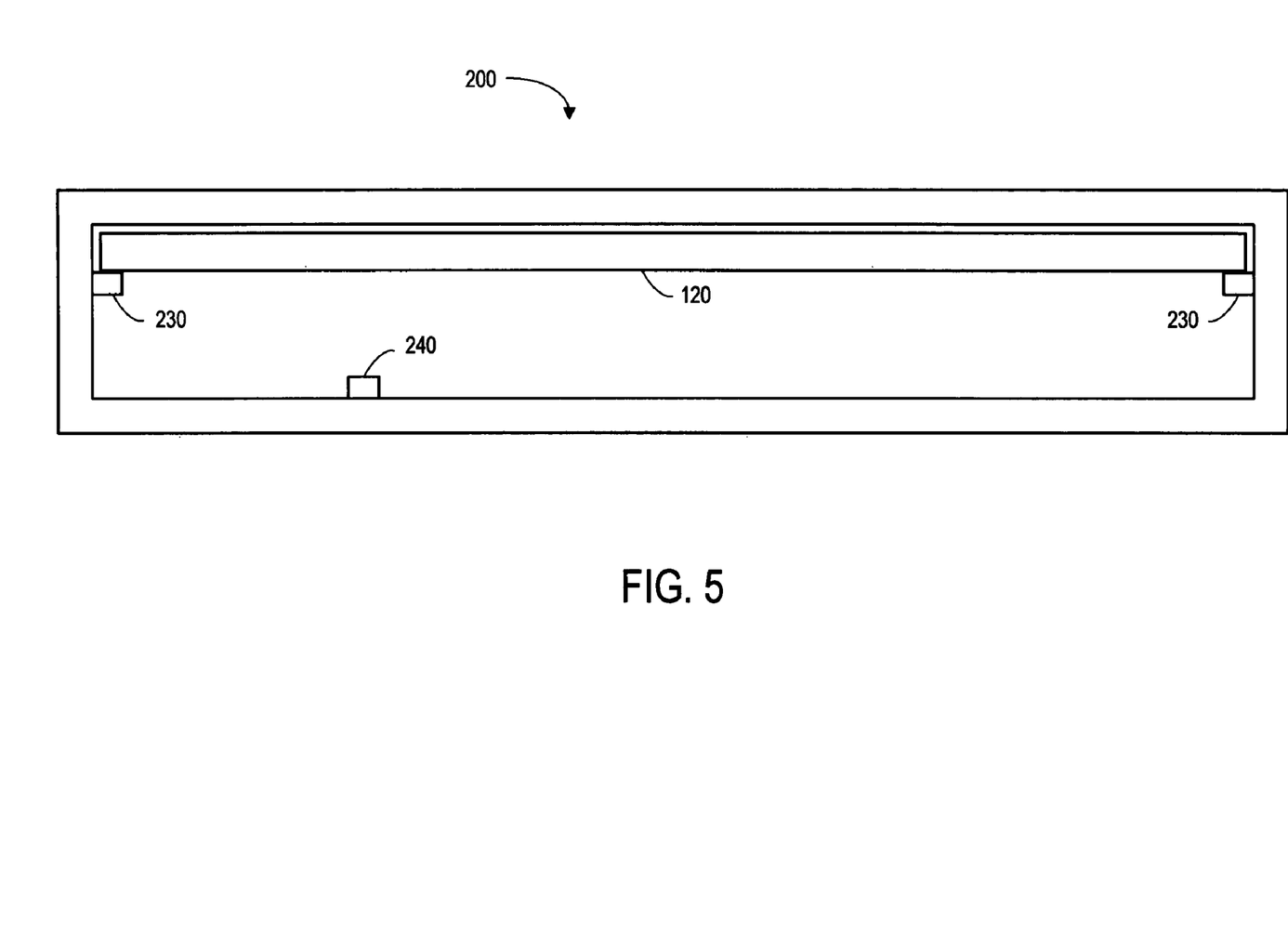
FIG. 5 illustrates the hybrid card interconnect when a Smart Card has been inserted according to some embodiments.

The guide members 230 are to move out of the first cavity when a card of the first type is received, and to remain in the first cavity when a card of the second type is received. Note that the guide members 230 may be movable rails (e.g., that retract into the side walls of the enclosure 230), spring loaded fingers (e.g., that rotate up, down, into, or out of the first cavity), and/or compressible members. By way of example, FIG. 4 illustrates the hybrid card interconnect 200 when an ExpressCard 110 has been inserted into the first cavity according to some embodiments. Note that in this case, the guide members 230 have been pushed or otherwise moved out of the first cavity by the ExpressCard 110. In contrast, FIG. 5 illustrates the hybrid card interconnect 200 when a Smart Card 120 has been inserted into the second cavity according to some embodiments. In this case, the guide members 230 have not been moved and instead support the Smart Card 120.

Referring again to FIG. 2, the hybrid card interconnect 200 may include a connection portion 250 proximate to the side of the enclosure 210 opposite the opening 220. According to some embodiments, the enclosure 210 and connection portion 250 are separate items that may be coupled together. According to other embodiments, the enclosure 210 and connection portion 250 comprise a single item. Also note that the connection portion 250 may, in some embodiments, be located on the bottom of the enclosure 210. Moreover, the end of the enclosure 210 opposite the opening 220 could be open, closed, or partially open.

The connection portion 250 may be adapted to be coupled to a PCB, such as a laptop computer motherboard. The connection portion 250 may have a first set of conductive paths to route signals from a first type of card to the PCB, and a second set of conductive paths to route signals from a second type of card to the PCB. For example, the first set of conductive paths may be located to route signals from an ExpressCard 110 to the PCB (e.g., a pin interface may be located at the back side of the first cavity).

The second set of conductive paths might be positioned to route signals from a Smart Card 120. For example, the conductive paths might include a set of contacts located on the inner surface of the top side of the enclosure 210. Referring again to FIG. 4, however, those contacts (some which may supply power to a Smart Card 120) on the inner surface of the top side of the enclosure 210 might also touch the top of an ExpressCard 110 when the ExpressCard 110 is inserted into the first cavity. Moreover, the outer shell of an ExpressCard might be conductive, which could result in a short between a power contact and a ground contact.

To avoid this situation, refer again to FIG. 3 wherein a switch 240 is provided in the first cavity such that the switch 240 is activated only when an ExpressCard 110 is received (e.g., and is not activated when a Smart Card 120 is received). In addition, when the switch 240 is activated power may be removed from the Smart Card contacts. For example, a micro-switch might mechanically cut-off power or a Field Effect Transistor (FET) device could be used to remove power from the contacts.

Figure 6:
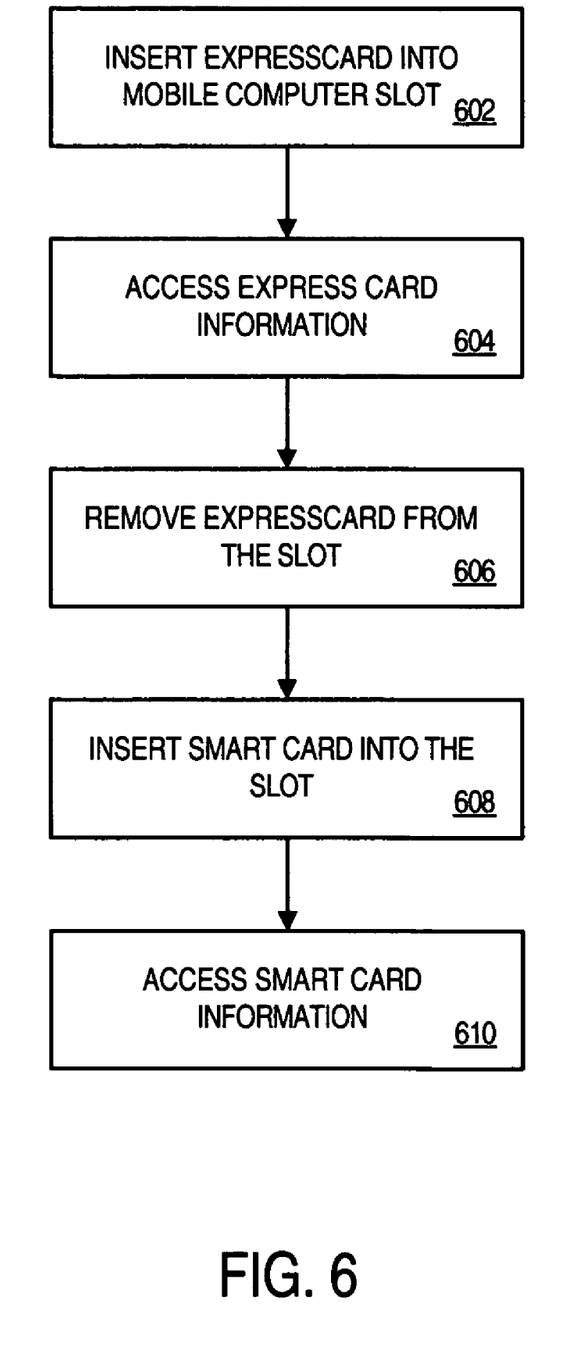
FIG. 6 is a flow chart of a method according to some embodiments.

FIG. 6 is a flow chart of a method according to some embodiments. At 602, a user inserts an ExpressCard into a slot of a mobile computer interconnect. At 604, information on the card is accessed. For example, the mobile computer might receive a wireless message via an ExpressCard device.

At 606, the user removes the ExpressCard from the slot. He or she can then insert a Smart Card into the slot at 608, and information on the card is accessed at 610. For example, the mobile computer might use information on the card to authenticate the user's identity. Note that according to this embodiment, only one of the ExpressCard and the Smart Card may be inserted into the slot at one time (e.g., both types of cards cannot be used simultaneously). Because the purposes of these types of cards are different, such a limitation might not be a problem for a user.

Moreover, by using the same volume to receive either an ExpressCard or a Smart Card and/or by using a single connection portion to route signals, the height of an interconnect might be reduced (e.g., as compared to the use of two separate interconnects). As a result, the thickness of a mobile computer might be reduced. In addition, the footprint of the interconnect on a PCB might not be increased (e.g., as compared to having side-by-side interconnects).

Figure 7:
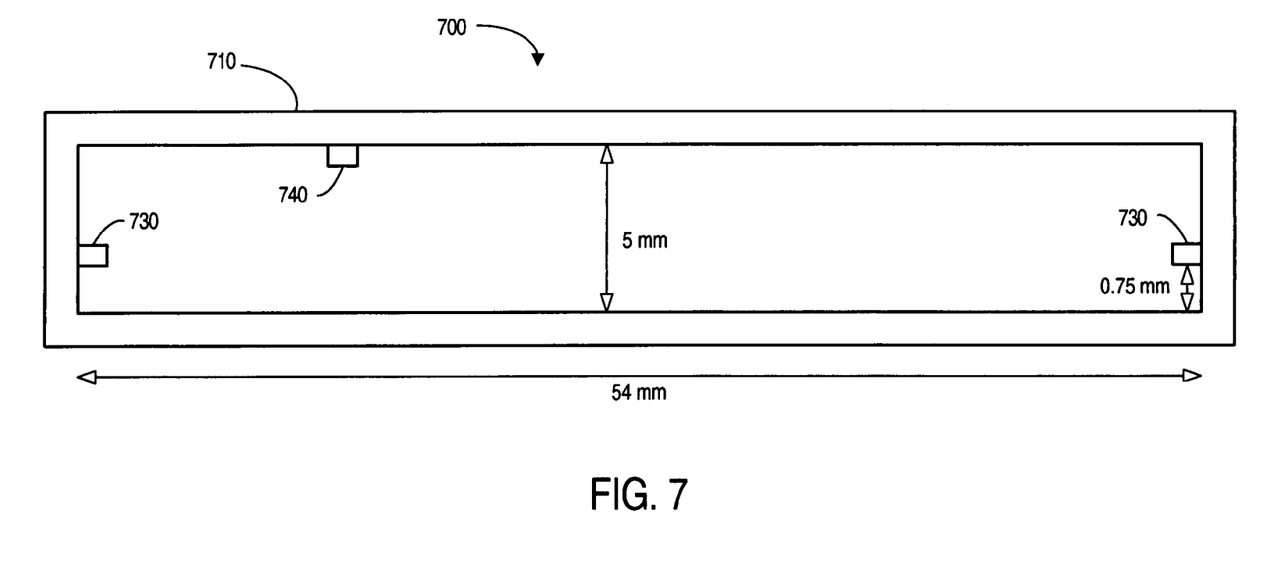
FIG. 7 is a front view of a hybrid card interconnect according to another embodiment.

The location and dimensions of the FIGS. and elements described and drawn herein are provided only for illustration, and any number of other arrangements might be provided instead. For example, FIG. 7 illustrates a front view of a hybrid card interconnect 700 according to another embodiment. As before, an enclosure 710 defines a first cavity with a 5 mm by 54 mm opening to receive an ExpressCard 110. In this case, however, a pair of movable guide members 730 define a 0.75 mm by 54 mm second cavity to receive a Smart Card 120 in the lower portion of the enclosure 710 (e.g., under the guide members 730). Note that in this case, the Smart Card contacts might be on the inner surface of the bottom side of the enclosure 710. Moreover, the switch 740 to remove power from those contacts when an Express Card 110 is received might be located on the inner surface of the top side.

Figure 8:
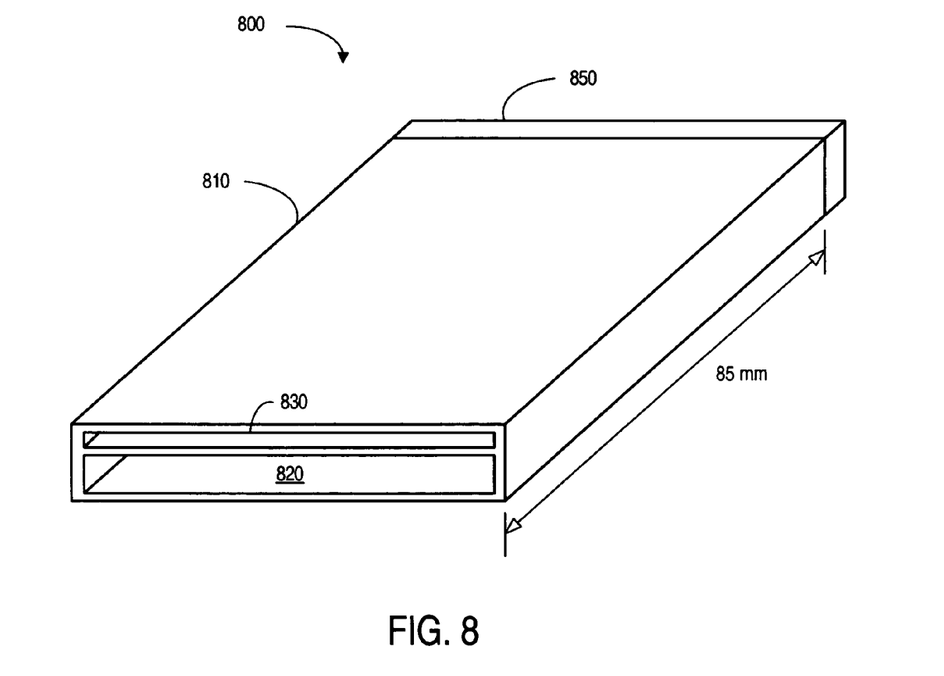
FIG. 8 is a perspective view of a hybrid card interconnect according to still another embodiment.

FIG. 8 is a perspective view of a hybrid card interconnect 800 according to still another embodiment. As before, the interconnect 800 has an enclosure 810 with a first opening 820 that defines a first cavity that is 85 mm deep. However, the enclosure 810 also has a second, separate opening 830 that defines a second cavity that is 85 mm deep and is substantially parallel to the first cavity.

Figure 9:
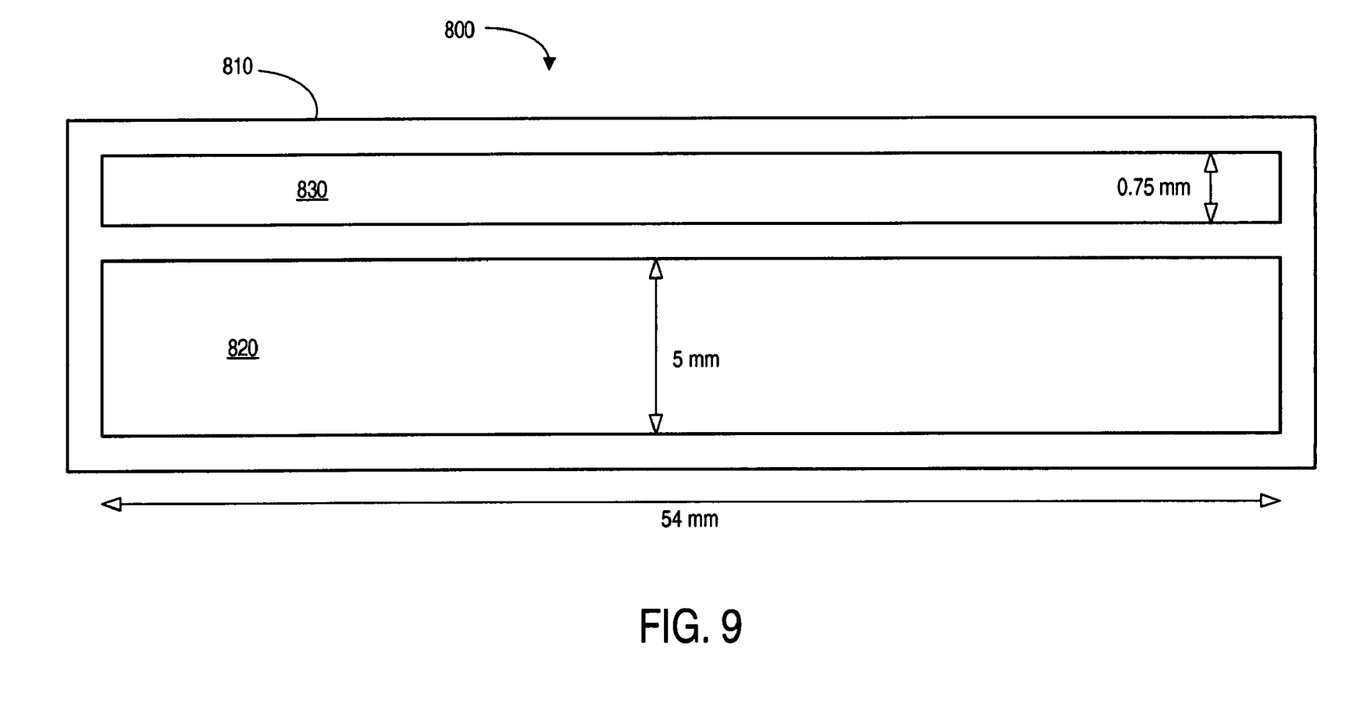
FIG. 9 is a front view of the hybrid card interconnect according to this embodiment.
Figure 10:
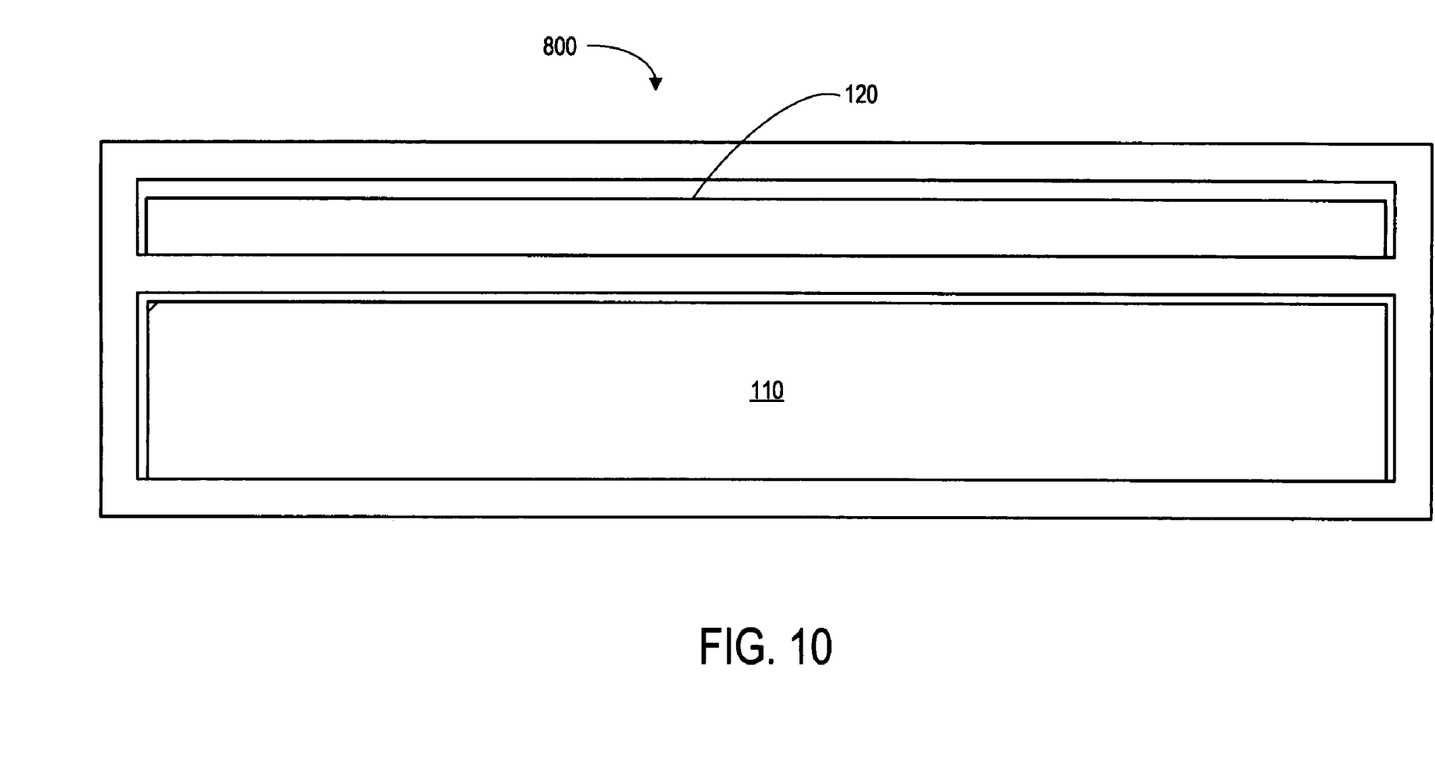
FIG. 10 illustrates the hybrid card interconnect when both an Express card and a Smart Card have been inserted according to this embodiment.

FIG. 9 is a front view of the hybrid card interconnect 900. According to some embodiments, the first opening 820 is to receive an ExpressCard 110. In this case, the distance between the inner sides of the first opening 820 in a first direction (horizontally in FIG. 9) is substantially 54 mm and the distance between the inner sides in a second direction (vertically in FIG. 9) is substantially 5 mm. The second opening 830 may be to receive a Smart Card 120. In this case, the distance between the inner sides of the second opening 830 is substantially 54 mm in a first direction and 0.75 mm in a second direction. FIG. 10 illustrates the hybrid card interconnect 800 when both an ExpressCard 110 and a Smart Card 120 have been inserted according to this embodiment.

Referring again to FIG. 8, the interconnect 800 further includes a connection portion 850 proximate to the side of the enclosure 810 opposite the openings 820, 830. The connection portion 850 may be, according to some embodiments, adapted to be coupled to a PCB. For example, the connection portion 850 may be associated with a first set of conductive paths to route signals associated with the side of the enclosure 810 opposite the openings 820, 830 (e.g., ExpressCard signals). The connection portion 850 might also have a second set of conductive paths to route signals associated with a different side of the enclosure 810. The second set of conductive paths might include, for example, Smart Card contacts located at the inner surface of the top side of the enclosure 810. Note that the positions of the openings 820, 830 illustrated in FIG. 8 could be reversed. That is, the larger ExpressCard opening 820 might instead be positioned above the smaller Smart Card opening 830 (e.g., and, in that arrangement, the inner surface of the lower side of the enclosure 800 might have Smart Card contacts. Note that the Smart Card contacts might instead be located on the middle wall of the enclosure 810.

Figure 11:
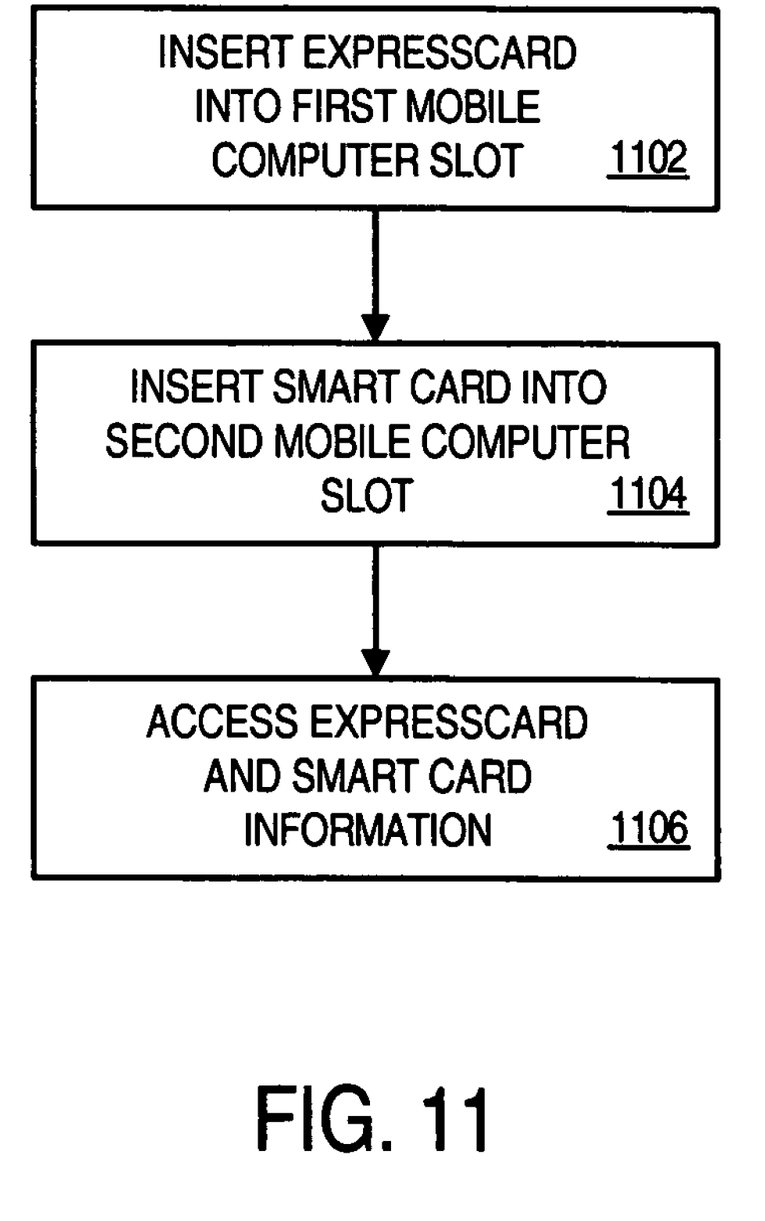
FIG. 11 is a flow chart of a method according to this embodiment.

FIG. 11 is a flow chart of a method according to this embodiment. At 1102, a user inserts an ExpressCard into a first slot of a mobile computer interconnect. At 1104, the user inserts a Smart Card into a second slot of the mobile computer interconnect. Information is then accessed from both the ExpressCard and the Smart Card at 1106. For example, the user might be authenticated based on information stored on the Smart Card and then be allowed to access a secure wireless Local Area Network (LAN) via an ExpressCard device.

Note that according to this embodiment, both an ExpressCard and a Smart Card can be used simultaneously. Moreover, although the height of the interconnect may be greater than the one described with respect to FIGS. 2 through 7, the height might still be reduced as compared to the use of two separate interconnects.

Figure 12:
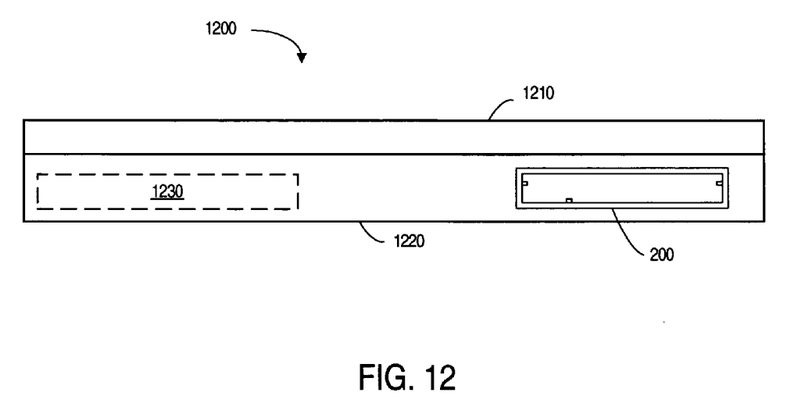
FIG. 12 is a block diagram of a system according to some embodiments.

FIG. 12 is a block diagram of a system 1200 according to some embodiments. The system 1200 may be associated with, for example, a laptop computer. The system 1200 includes a display portion 1210 that may be rotated away from a main body portion 1220. The main body portion 1220 might include, for example, a hard disk drive 1230, an INTEL® Architecture (IA) processor, such as an INTEL® Pentium IV processor, and/or a keyboard. The main body 1220 also includes a hybrid card interconnect 200 according to any of the embodiments described herein.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

According to some embodiments described herein, a switch is provided and positioned such that the switch is activated only when an ExpressCard 110 is received. Moreover, the switch removes power from Smart Card contacts when it is activated. According to another embodiment, a switch may be provided and positioned such that the switch is activated only when a Smart Card 120 is received. In this case, the switch may provide power to the Smart Card contacts when it is activated.

The several embodiments described herein are solely for the purpose of illustration. Persons skilled in the art will recognize from this description other embodiments may be practiced with modifications and alterations limited only by the claims.

What is claimed is:

1. An apparatus, comprising:
   an enclosure having a rectangular opening at one side and defining a first rectangular cavity within the enclosure to receive a first type of card, the first rectangular cavity having:
      a top surface defined by a top inner surface of the enclosure,
      a left surface defined by a left inner surface of the enclosure,
      a right surface defined by a right inner surface of the enclosure opposite the left inner surface, and
      a bottom surface defined by a bottom inner surface of the enclosure opposite the top inner surface; and
   movable guide members coupled to the left and right inner surfaces of the enclosure and defining a second rectangular cavity, within the first cavity, to receive a second type of card, the second rectangular cavity having:
      a top surface defined by the top inner surface of the enclosure,
      a left surface defined by the left inner surface of the enclosure,
      a right surface defined by the right inner surface of the enclosure opposite the left inner surface, and
      a bottom surface defined by top surfaces of the movable guide members opposite the top inner surface,
   wherein the second type of card is to be received between the top, left, right, and bottom surfaces of the second rectangular cavity.

2. The apparatus of claim 1, wherein the distance between the left and right inner surfaces is substantially 54 millimeters, the distance between the top and bottom surfaces of the first rectangular cavity is substantially 5 millimeters, and the distance between the enclosure top and bottom surfaces of the second rectangular cavity is substantially 0.75 millimeters.

3. The apparatus of claim 2, wherein the distance between a plane defined by the opening and the inner surface of the opposite side of the enclosure is substantially 85 millimeters.

4. The apparatus of claim 1, further comprising:
   a connection portion proximate to the side of the enclosure opposite the opening and to be coupled to a printed circuit board.

5. The apparatus of claim 4, wherein the connection portion is associated with (i) a first set of conductive paths to route signals from a card of the first type to the printed circuit board and (ii) a second set of conductive paths to route signals from a card of the second type to the printed circuit board.

6. The apparatus of claim 5, wherein the first set of conductive paths route signals associated with the side of the enclosure opposite the opening and the second set of conductive paths route signals associated with another side of the enclosure.

7. The apparatus of claim 1, wherein the guide members are to move out of the first cavity when a card of the first type is received and to remain in the first cavity when a card of the second type is received.

8. The apparatus of claim 7, wherein the guide members comprise at least one of (i) rails, (ii) spring loaded fingers, or (iii) compressible members.

9. The apparatus of claim 1, further comprising:
   a switch to adjust a power setting when a card of the first type is received and to not adjust the power setting when a card of the second type is received.

10. The apparatus of claim 9, wherein the switch is associated with at least one of (i) a mechanical switch or (ii) a field effect transistor.

11. The apparatus of claim 1, wherein the enclosure is associated with a mobile computer.

12. A system, comprising:
   an enclosure having a rectangular opening at one side and defining a first rectangular cavity within the enclosure to receive a first type of card, the first rectangular cavity having:
      a top surface defined by a top inner surface of the enclosure, a left surface defined by a left inner surface of the enclosure, a right surface defined by a right inner surface of the enclosure opposite the left inner surface, and a bottom surface defined by a bottom inner surface of the enclosure opposite the top inner surface; and movable guide members coupled to the left and right inner surfaces of the enclosure and defining a second rectangular cavity, within the first cavity, to receive a second type of card, the second rectangular cavity having:

a top surface defined by the top inner surface of the enclosure, a left surface defined by the left inner surface of the enclosure, a right surface defined by the right inner surface of the enclosure opposite the left inner surface, and a bottom surface defined by top surfaces of the movable guide members opposite the top inner surface, wherein the second type of card is to be received between the top, left, right, and bottom surfaces of the second rectangular cavity.

13. The system of claim 12, wherein the system is a laptop computer.

* * * * *